United States Patent [19]
Gill et al.

[11] Patent Number: 5,653,013
[45] Date of Patent: Aug. 5, 1997

[54] TWO TERMINAL SINGLE STRIPE ORTHOGONAL MR HEAD

[75] Inventors: Hardayal Singh Gill, Portola Valley; Douglas Johnson Werner, Fremont, both of Calif.

[73] Assignee: International Business Machines Corporation, Armonk, N.Y.

[21] Appl. No.: 486,433

[22] Filed: Jun. 7, 1995

Related U.S. Application Data

[62] Division of Ser. No. 292,647, Aug. 18, 1994, Pat. No. 5,557,491.

[51] Int. Cl.⁶ .............................. G11B 5/127; H01F 7/06
[52] U.S. Cl. ...................... 29/603.14; 29/603.15; 360/113
[58] Field of Search ............. 29/603.08, 603.12–603.16, 29/603.2; 360/113, 122; 427/458

[56] References Cited

U.S. PATENT DOCUMENTS

| | | | |
|---|---|---|---|
| 3,967,368 | 7/1976 | Brock et al. | 29/603.15 X |
| 4,639,806 | 1/1987 | Kira et al. | 360/113 |
| 4,654,739 | 3/1987 | Takahashi et al. | 360/113 |
| 4,663,684 | 5/1987 | Kamo et al. | 360/113 |
| 4,833,560 | 5/1989 | Doyle | 360/113 |
| 4,894,741 | 1/1990 | French | 360/113 |
| 4,928,188 | 5/1990 | Brock | 360/113 |
| 5,005,096 | 4/1991 | Krounbi et al. | 360/113 |
| 5,079,035 | 1/1992 | Krounbi et al. | 427/130 |
| 5,270,893 | 12/1993 | Sasaki et al. | 360/113 |
| 5,311,385 | 5/1994 | Schwarz et al. | 360/113 |
| 5,351,158 | 9/1994 | Shibata | 360/113 |
| 5,438,747 | 8/1995 | Krounbi et al. | 29/603.16 |

FOREIGN PATENT DOCUMENTS

| | | | |
|---|---|---|---|
| 53-39110 | 10/1978 | Japan . | |
| 58-155483 | 8/1983 | Japan | 360/113 |
| 58-220241 | 12/1983 | Japan . | |
| 58-205921 | 12/1983 | Japan . | |
| 60-85405 | 5/1985 | Japan . | |
| 60-157712 | 8/1985 | Japan . | |
| 61-134913 | 6/1986 | Japan . | |
| 61-296522 | 12/1986 | Japan . | |
| 1125-712 | 5/1989 | Japan . | |
| 2-56713 | 2/1990 | Japan . | |
| 2286877 | 10/1990 | Japan | 360/113 |
| 5-28435 | 2/1993 | Japan . | |
| 5-28439 | 2/1993 | Japan . | |
| 5-46946 | 2/1993 | Japan . | |

OTHER PUBLICATIONS

IBM Technical Disclosure Bulletin, vol. 24, No. 8, Jan. 1982, "Vertical record head".

T. Shibata et al., CA–02 Performance Characteristics of a 4–Terminal Vertical Magnetoresistive/Inductive Head, The 6th Joint MMM–Intermag Conference, Abstracts, Albuquerque, New Mexico, Jun. 20–23, 1994, pp. 142–143.

*Primary Examiner*—Peter Vo
*Assistant Examiner*—Khan Nguyen
*Attorney, Agent, or Firm*—Baker, Maxham, Jester & Meador

[57] ABSTRACT

A method of making a thin film orthogonal MR head is provided which includes a single MR stripe, a first lead layer which has first and second ends and a second lead layer which has first and second ends, the first end of the first lead layer being connected to the bottom portion of the MR stripe and the first end of the second lead layer being connected to a top portion of the MR stripe. First and second terminals are provided, the second end of the first layer being connected to the first terminal and the second end of the second lead layer being connected to the second terminal. The second lead layer extends across the MR stripe between the top and bottom portions of the MR stripe so as to induce a magnetic bias field into the MR stripe when a sense current is conducted through the MR stripe via the first and second terminals. Only the first and second terminals are employed for providing sense current for the MR stripe and transverse biasing of the MR stripe. The first lead is substantially planar across a bottom portion of the MR stripe so that a well formed second pole tip of a write head portion can be constructed.

34 Claims, 8 Drawing Sheets

TWO TERMINAL SINGLE STRIPE ORTHOGONAL MR HEAD

CROSS REFERENCE TO RELATED APPLICATION

This application is a division of application Ser. No. 08/292,647 filed Aug. 18,1994, is now U.S. Pat. No. 5,557, 491.

BACKGROUND OF THE INVENTION

1. Field of the Invention

The present invention relates to a method of making an orthogonal magnetoresistive (MR) head and more particularly to an orthogonal MR head which employs two terminals for conducting a sense current through an MR stripe and for transversely biasing the MR stripe.

2. Description of the Related Art

An orthogonal MR head includes an MR stripe sandwiched between first and second gap layers which in turn are sandwiched between first and second shield layers. The orthogonal MR head differs from the ordinary MR head in that the MR stripe extends perpendicular to its head surface, the head surface being the surface which faces a magnetic medium for sensing read signals. The orthogonal MR head has a first lead, connected to a bottom portion of the MR stripe, and a second lead, connected to a top portion of the MR stripe, the first lead and the bottom portion of the MR stripe forming a portion of the head surface.

The orthogonal MR head can be used alone or can be combined with a write head in an integrated write/read structure. Two such integrated structures are the "piggyback" head and the "merged" head. In the piggyback and merged heads, a write head is stacked on top of an MR read head. The merged head employs the second shield of the MR read head as a first pole piece for the write head. In contrast the piggyback head employs a separate layer for the first pole piece.

In a typical orthogonal MR head two terminals are employed for conducting a sense current through a pair of MR stripes. When the sense current flows, the MR stripes back bias each other with a magnetic field which induces a longitudinal bias: The use of two MR stripes to induce longitudinal bias inherently overbiases both of the MR stripes, causing them to be less sensitive to a read signal. In order to overcome this problem it has been proposed that only a single MR stripe be employed and that the MR stripe be longitudinally biased by track edge exchange or hard bias stabilization and transversely biased by a conductor which extends laterally across the MR stripe between its top and bottom portions. However, this configuration requires at least an extra terminal for the conductor. An extra terminal increases the size of the head and runs counter to the present day goal of minimizing head size and simplifying fabrication.

A problem is encountered in the construction of an integrated write/read head that includes an orthogonal MR transducer. It is difficult to form the second pole tip for the write head because of a nonplanar configuration of the layers which form the orthogonal MR transducer. This nonplanar configuration is caused by the contour of the first lead across the bottom portion of the MR stripe. Still another problem of the orthogonal MR head is shorting between the second lead and either of the first and second shield layers at the head surface. This is caused by smearing of the conductive material of the first and second shields during lapping to form the head surface.

SUMMARY OF THE INVENTION

The present invention provides a thin film orthogonal MR head which includes a single MR stripe which is transversely biased by a conductor which extends laterally across the MR stripe between its top and bottom ends. We have found that we can limit the number of terminals in the head by employing the second lead layer as a conductor for transversely biasing the MR stripe. Accordingly, in our invention the second lead layer, which is connected to a top portion of the MR stripe, extends across the MR stripe between its top and bottom portions so that this extension will induce a magnetic bias field into the MR stripe when the sense current is conducted through the MR stripe and the second lead layer. With this arrangement only two terminals are required, one terminal being connected to the first lead and the other terminal being connected to the second lead. When a sense current is conducted through the MR stripe via the first and second terminals, the MR stripe is automatically transversely biased by the extension of the second lead across the MR stripe, therefore obviating the need for the extra terminals for a separate conductor. The invention overcomes the overbiasing problem caused by using two MR stripes.

The second lead which also serves as the biasing conductor, is a single thin film layer which is substantially planar. An unexpected result from this construction is that the second lead layer is provided with more protection from shorting to the first shield layer than that provided by the prior art orthogonal MR head. The present invention provides a mid-gap insulation layer between the second lead and the MR stripe to electrically insulate these layers from one another. The invention extends the mid-gap insulation layer throughout the entire expanse of the second lead so as to provide an extra insulation layer in addition to the first gap layer for insulating the second lead from the first shield layer.

The present invention also provides for a planarized extension of the first lead layer directly adjacent the second pole tip of a write head so that the second pole tip can be well-formed. This is accomplished by forming the MR stripe along with any additional layers laminated therewith in a planar configuration with longitudinal biasing layers at each side edge of the MR stripe. Accordingly, when the first lead transitions up onto the longitudinal biasing layers and the MR stripe it will be planar immediately adjacent the second pole tip of the write head. With this arrangement nonplanar configurations will not be replicated into the second pole tip when it is constructed. The present invention also eliminates failure by inadvertent shorting between the first lead and either of the first and second shield layers at the head surface. This is accomplished by a unique arrangement of shorting the first lead to both of the first and second shield layers by design and connecting all of these layers to ground.

An object of the present invention is to provide an improved orthogonal MR head which employs a conductor for inducing transverse bias in a single MR stripe.

Another object is to employ the second lead of an orthogonal MR head as a conductor for transversely biasing a single MR stripe wherein the second lead is constructed in its entirety as a single thin film layer.

A further object is to minimize shorting between the second lead layer and the first shield layer of an orthogonal MR head by providing an extra insulation layer between the first gap layer and the second lead layer without sacrificing planarization during the construction of the head.

Still another object is to provide a highly planar orthogonal MR head.

Yet another object is to provide an orthogonal MR head wherein a single MR stripe can be transversely biased by a conductor without the requirement of additional terminals for conducting a current through the conductor.

Still another object is to provide a merged orthogonal MR head wherein a read head portion is sufficiently planar to support formation of a second pole tip of a write head portion.

Still a further object is to accomplish any one or combination of the foregoing objects while eliminating as a failure mode shorting between the MR stripe and either of the shield layers at the head surface of the head.

Still another object is to provide an orthogonal MR head according to the above objects which can be fabricated with few processing steps.

Still another object is to provide a method for constructing an orthogonal MR head according to any one or combination of objects hereinabove.

The foregoing, together with other objects, features and advantages of this invention, will become apparent when referring to the following specification, claims and the accompanying drawings.

DESCRIPTION OF THE PREFERRED EMBODIMENTS

Figure 1:
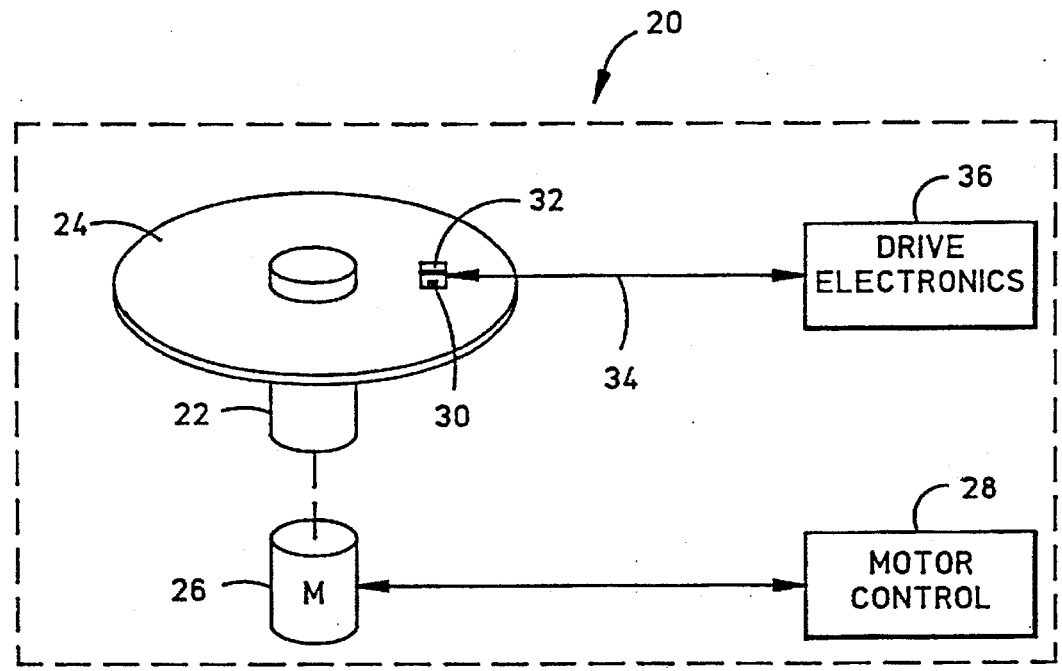
FIG. 1 is a schematic illustration of a magnetic disk drive.

Referring now to the drawings wherein like reference numerals designate like or similar parts throughout the several views a magnetic disk drive 20 is illustrated in FIG. 1 The drive 20 includes a spindle 22 which supports and rotates a disk 24. The spindle 22 is rotated by a motor 26 which is controlled by motor controls 28. A magnetic head 30, which may be a merged MR head according to the present invention, is mounted on a slider 32 which in turn is supported by a suspension and actuator arm 34. The suspension and actuator arm 34 positions the slider 32 so that the magnetic head 30 is in a transducing relationship with a surface of the magnetic disk 24. When the disk 24 is rotated by the motor 26, air moved by the top of the disk causes the slider to ride on an air-bearing slightly off of the surface of the disk. The magnetic head 30 is then employed for writing and reading information signals in multiple circular tracks on the surface of the disk 24. These information signals as well as servo signals for moving the slider to various tracks are processed by drive electronics 36 which is connected to the magnetic head 30.

Figure 2:
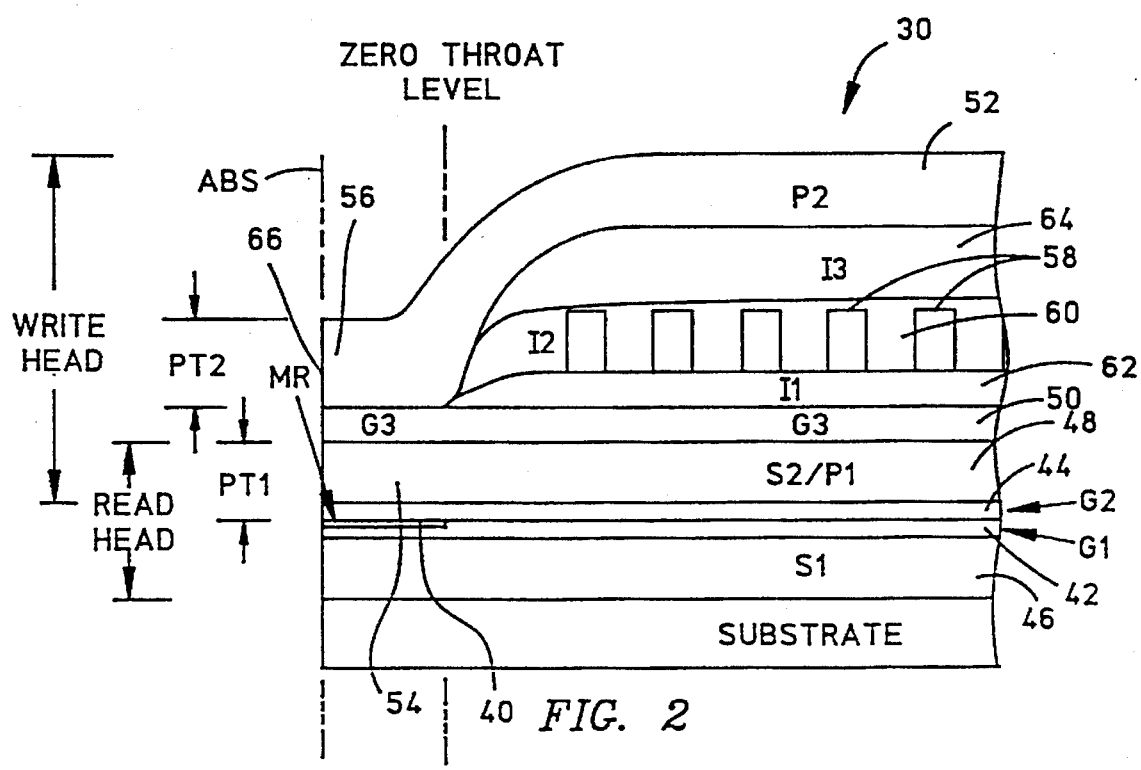
FIG. 2 is a schematic cross-sectional elevation view of a merged MR head.

FIG. 2 is a side cross-sectional elevation view of a front portion of a merged orthogonal MR head. The merged MR head 30 includes a write head portion which is stacked on top of an MR read head portion. The MR read head portion includes an MR stripe 40 which is sandwiched between first and second gap layers 42 and 44 which are in turn sandwiched between first and second shield layers 46 and 48. First and second leads (not shown in FIG. 2), which are connected to the MR stripe, and elements (not shown in FIG. 2) for longitudinally and transversely biasing the MR element 40 will be described with reference to subsequent figures in the drawings. The second shield layer 48 is employed as the first pole piece for the write head. This type of head is referred to as a merged MR head. In a piggyback MR head the first pole piece is a separate layer on top of the second shield layer of the MR read head. A gap layer 50 is sandwiched between the first pole piece 48 and a second pole piece 52. The forward ends of these pole pieces 48 and 52 form a first pole tip 54 and a second pole tip 56 respectively which are magnetically separated by the gap layer 50. A coil layer 58 and a second insulation layer 60 are sandwiched between first and third insulation layers 62 and 64 which are in mm sandwiched between the first and second pole pieces 48 and 52. The forward end of the insulation layer 62 establishes a zero throat level and the forward ends of all of the layers forward of the zero throat level form an air bearing surface (ABS) 66. This air bearing surface is constructed by lapping the front of the head until the air bearing surface has been formed. It should be understood that FIG. 2 is exemplary of a head which employs the present invention. Instead of a merged MR head the invention can be an MR read head only or can be combined with a write head to form a piggyback MR head.

Figure 3:
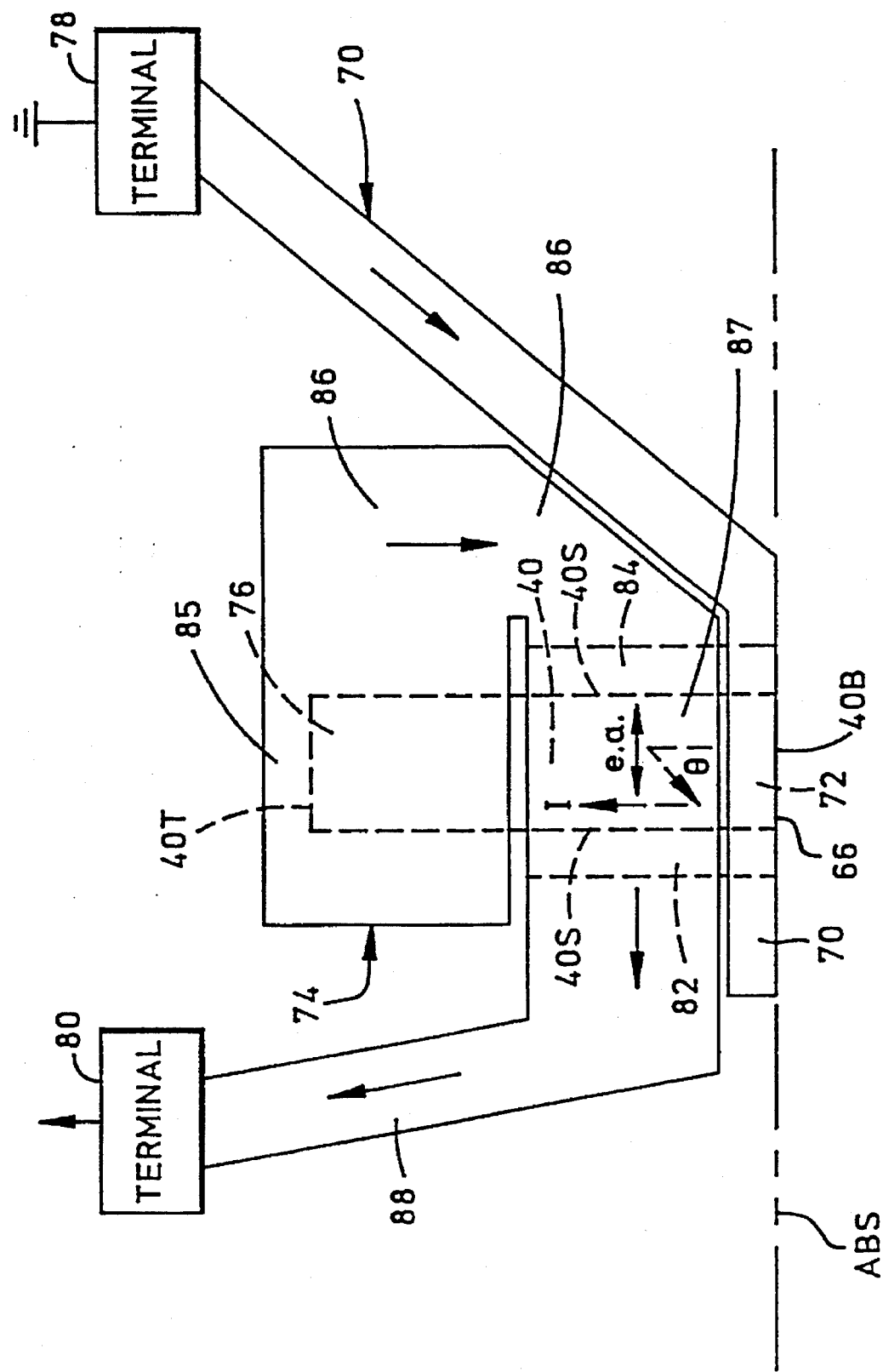
FIG. 3 is a schematic planar illustration of some of the thin film layers of the present orthogonal MR head.

FIG. 3 is a simplified schematic illustration of the present invention. The MR stripe 40 is oriented perpendicular to the head surface or ABS 66 of the head with its easy axis extending parallel to the head surface. The MR stripe 40 is bounded by top and bottom edges 40T and 40B and side edges 40S. A first lead 70 has a first end connected to a bottom surface portion 72 of the MR stripe and a second lead 74 has a first end connected to a top surface portion 76 of the MR stripe. Second ends of the first and second leads 70 and 74 are connected to first and second terminals 78 and 80 respectively. Longitudinal hard biasing layers 82 and 84 are located adjacent the edges 40S of the MR stripe for longitudinally biasing the MR stripe. The longitudinal biasing substantially establishes the MR stripe in a single domain state along its easy axis so as to minimize Barkhausen noise. The bottom edge 40B of the MR stripe and a bottom edge of the first lead 70 form a portion of the head surface 66. The first terminal 78 is connected to ground and the second terminal 80 is connected to magnetic head signals and controls 36. The connection of the first terminal 78 to ground has an importance which will be explained in more detail hereinafter.

In order to render the MR stripe sensitive to signals from adjacent moving magnetic media it must be biased transversely to its easy axis. A conductor extending across the MR stripe between its bottom and top portions 72 and 76 is employed to transversely bias the single MR stripe 40. However, the conductor requires an additional terminal to provide the bias current. The present invention provides transverse biasing by configuring the second lead 74 so that it extends across the MR stripe and transversely biases the MR stripe when a sense current is applied to the MR stripe via the terminals 78.and 80. With this arrangement only two terminals are required.

Figure 4:
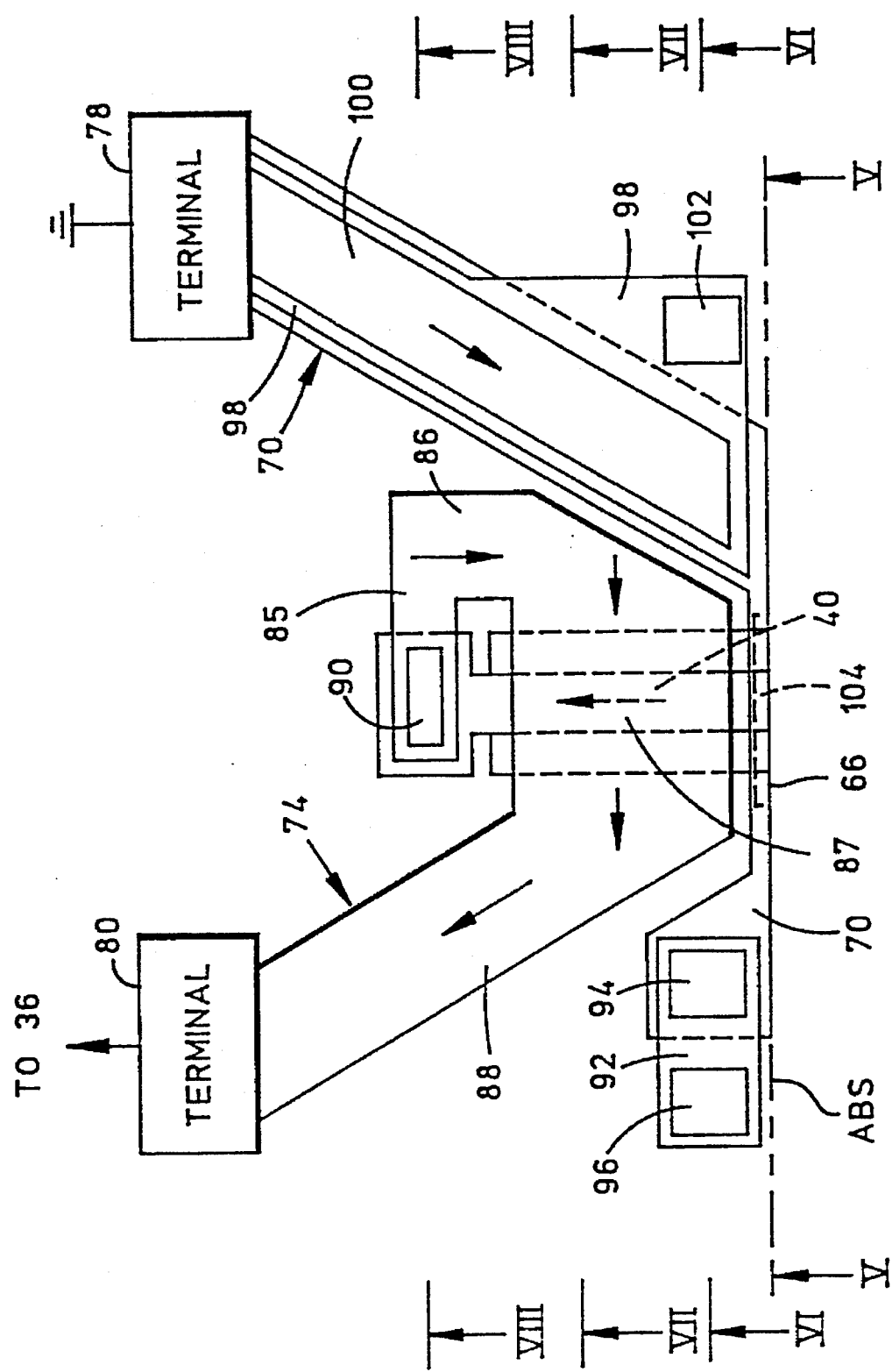
FIG. 4 is a schematic illustration similar to FIG. 3 except vias for connections and other details are illustrated.

As shown in FIG. 3, the lead 74 has first, second, third and fourth portions 85, 86, 87 and 88 respectively. A part of the first portion 85 is connected to the top portion 76 of the MR stripe by a via 90 as shown in FIG. 4. This first portion 85 extends substantially transversely to the MR stripe. The second portion 86 extends from the first portion downwardly toward the head surface 66. The third portion 87 extends transversely from the second portion across the MR stripe 40 and is insulated therefrom which will be explained in more detail hereinafter. The fourth portion 88 extends from the third portion to the second terminal 80. The entire second lead is a single thin film layer which has a substantially planar configuration. The construction of the second lead will be discussed in more detail hereinafter.

Figure 6:
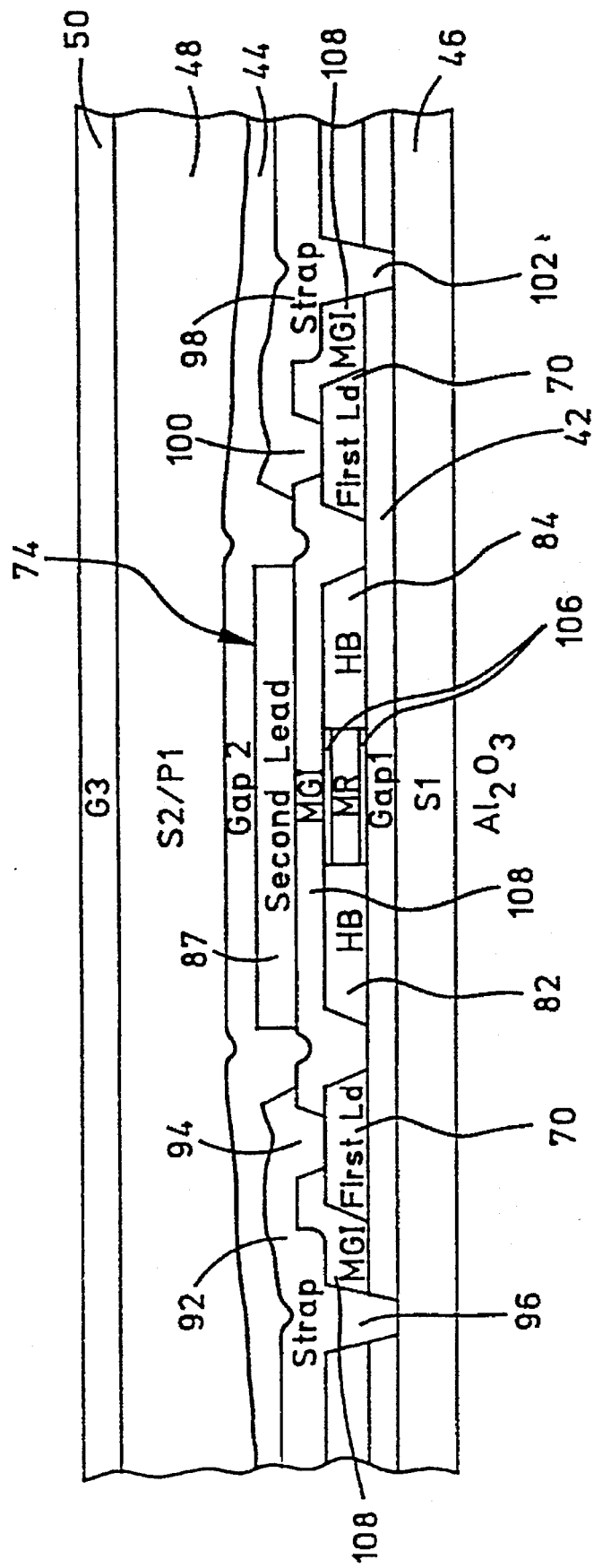
FIG. 6 is similar to FIG. 5 except it is taken along plane VI—VI of FIG. 4.

FIG. 4 is similar to FIG. 3 except it shows more detail for an actual embodiment of the present invention. FIG. 6 is a cross-sectional view taken along plane VI—VI of FIG. 4 just above the head surface 66. In reference to FIGS. 4 and 6, the first lead 70 is connected to a strap 92 by a via 94 and the strap 92 is in turn connected to the first shield layer 46 by a via 96. This connects the first lead 70 to the first shield 46 which is part of the scheme to eliminate as a failure mode electrical shorting between the first and second shield layers and the MR stripe at the head surface which will be explained in more detail hereinafter. Still referring to FIGS. 4 and 6, the first lead 70 is connected to another strap 98 by a via 100 and the strap 98 is connected to the first shield layer 46 by a via 102. This redundantly connects the first lead 70 again to the first shield layer 46. As shown in FIG. 4 the via 100 extends substantially the full length of the first lead 70 from the head surface 66 to the terminal 78 thereby substantially reducing the resistance of the first lead, increasing the strength of sensed signals. As shown in FIG. 4 the strap 92 is generally rectangular shaped while the strap 98 is a large triangular shape. A single thin film deposition forms the second lead 74 and both of the straps 92 and 98 thereby simplifying the construction of the head.

Figure 5:
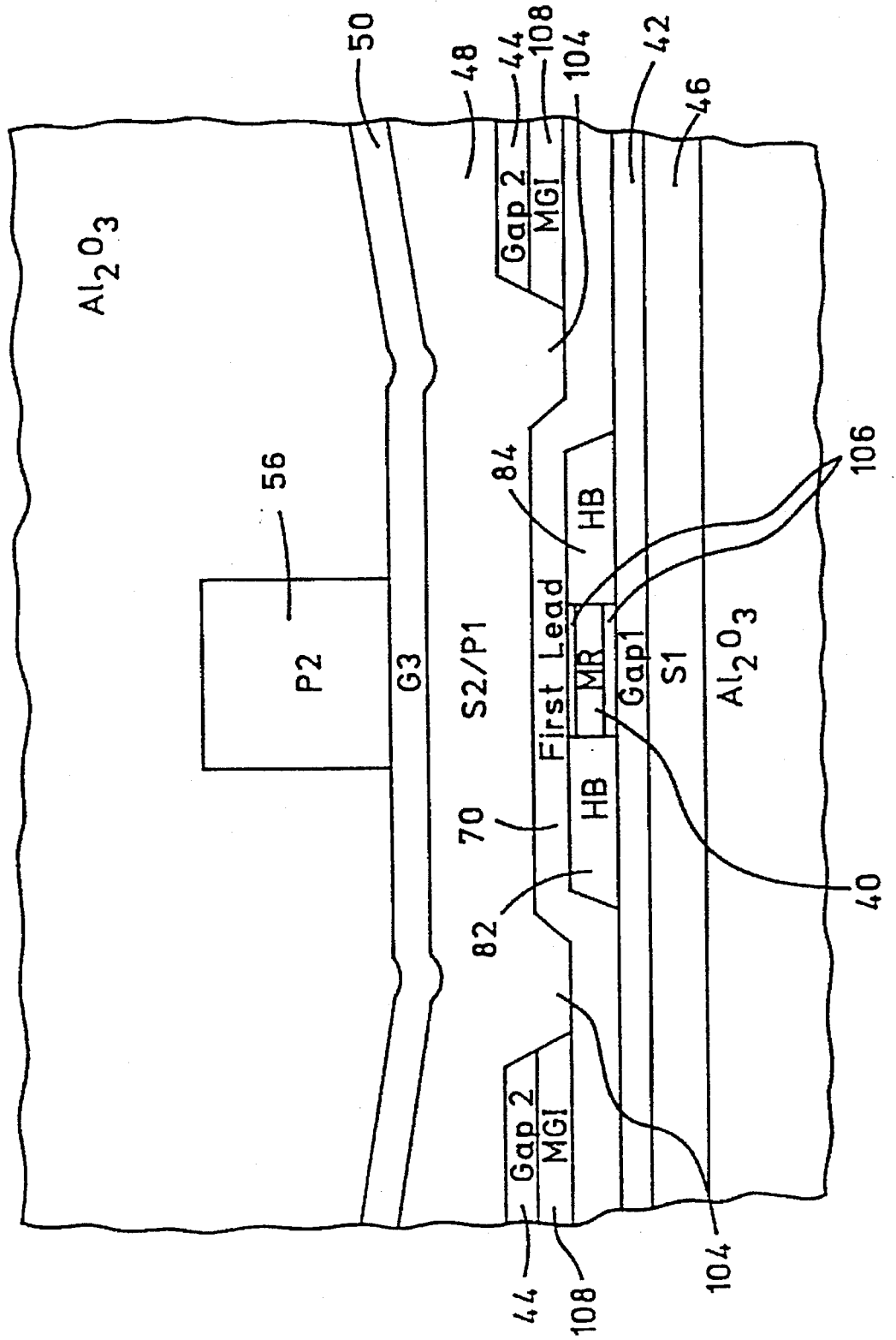
FIG. 5 is a head surface view taken along plane V—V of FIG. 4 including a write head portion.
Figure 8:
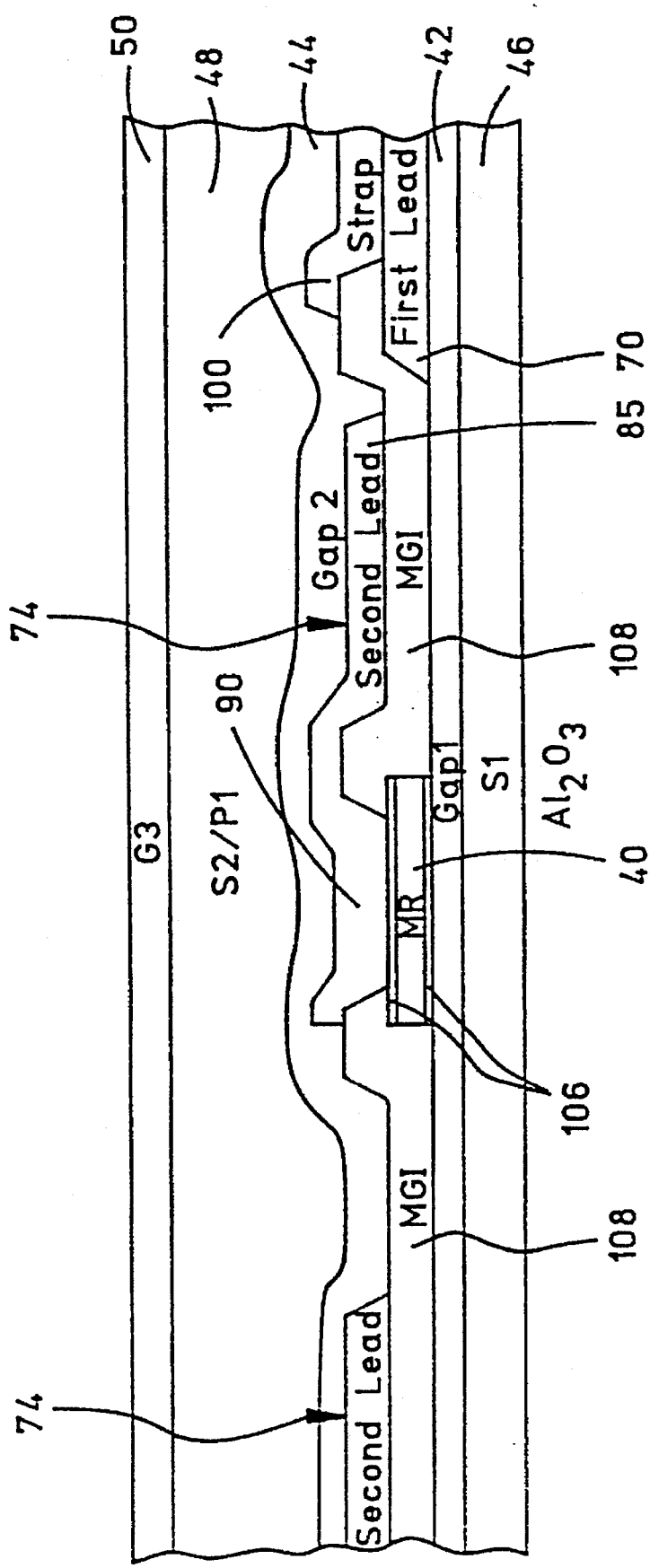
FIG. 8 is similar to FIG. 5 except it is taken along a, plane VIII—VIII of FIG. 4.

FIG. 5 is a head surface or HBS view of the head taken along plane V—V of FIG. 4. In reference to FIGS 4 and 5, a bottom portion of the MR stripe is connected to the second shield layer 48 by the first lead 70 and via 104. The first lead 70 serves as a second gap layer in the area between the via while the second gap layer 44 provides a gap for the remainder of the head. Since the first lead 70 has been shorted by the via 104 to the second shield layer 48, this completes the scheme of connecting the first and second shield layers 46 and 48 and the MR stripe at the head surface 66 thereby eliminating shorting between these layers as a potential failure mode. Since the first lead 70 is grounded at the first terminal 78, the MR stripe and the first and second shield layers 46 and 48 are grounded so that any smearing of conductive material therebetween will not alter the circuit path and so will not affect the operation of the head. It should be understood that the first lead 70 could be placed under the MR stripe as an alternative in which case it would serve as a first gap layer at the head surface. With this arrangement a via would have to be provided for shorting the first lead layer 70 to the second shield layer 48 and the second gap layer 44 would be provided without a via so as to provide a gap for the MR stripe at the head surface 66. FIGS. 4 and 8 Show the first portion 85 of the second lead 74 connected to the MR stripe by the via 90.

It is important to note from FIG. 5 that the top and bottom surfaces of the longitudinal biasing layers 82 and 84 are coextensive with the MR stripe and top and bottom protective tantalum layers 106. This provides a substantially planar width which is greater than the width of the second pole tip 56. Accordingly, when the first lead 70 is deposited on the top surfaces of the longitudinal biasing layers 82 and 84, the MR stripe and the tantalum layers 106, the first lead 70 is substantially planar below the area of the second pole tip 56. With this arrangement there are no steps in the first lead 70 directly below the second pole tip 56 which would be replicated into the second pole tip during its construction.

Since the second lead 74 is an electrical conductor it is necessary to insulate the third portion 87 of this lead from the film surface of the MR stripe as the third portion extends transversely thereacross. As shown in FIG. 6 this is accomplished by providing a mid-gap insulation layer (MGI) 108 between the MR stripe and the third portion 87 of the second lead. We have discovered, however, that by extending this mid-gap insulation layer 108 under the entire second lead it provides an additional insulation layer to prevent any possible shorting between the second lead 74 and the first shield layer 46.

Figure 9:
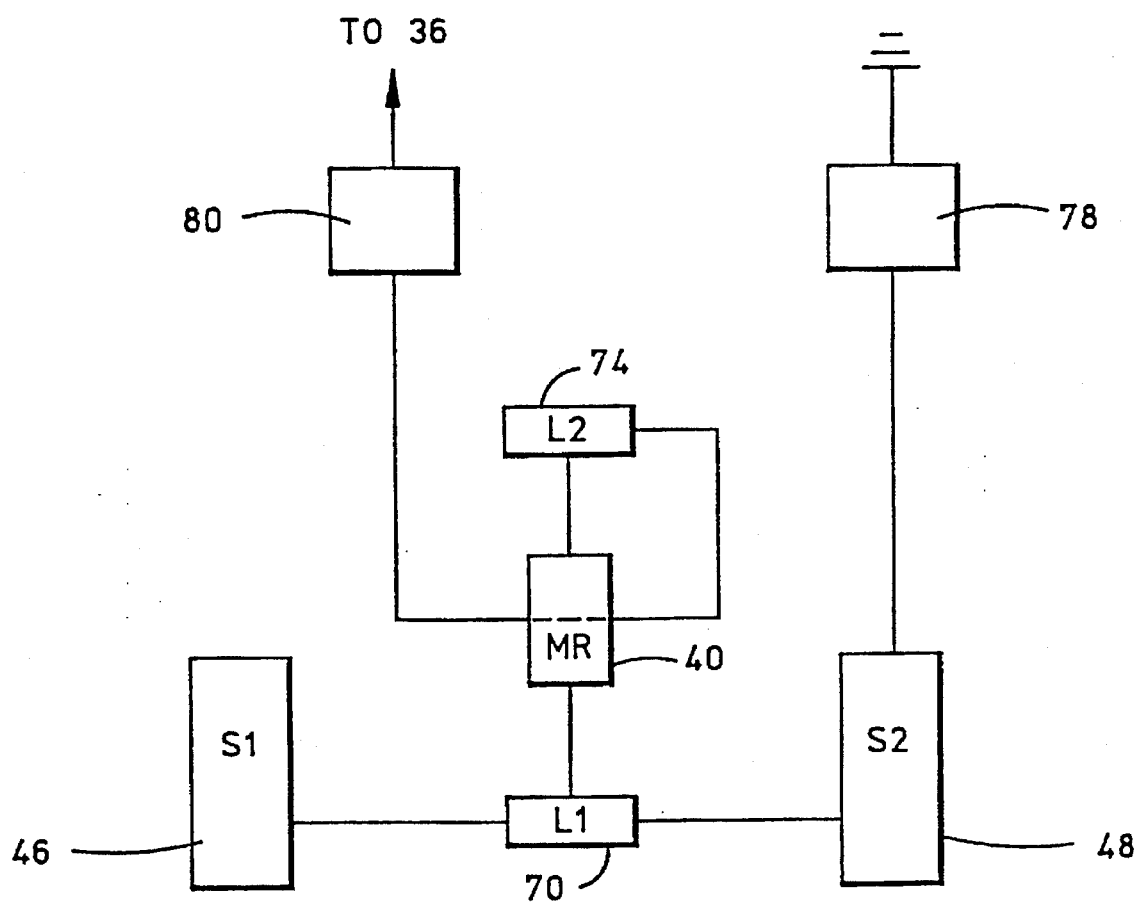
FIG. 9 is a schematic illustration of circuitry for the present orthogonal MR head.

FIG. 9 shows exemplary circuitry for the merged orthogonal MR had 30. The first lead 70 is connected to the first and second shields 46 and 48 and to ground. The MR stripe 40 is connected between the first and second leads 70 and 74. The second lead 74 extends across the MR stripe and is connected through the terminal 80 to drive electronics 36.

Figure 7:
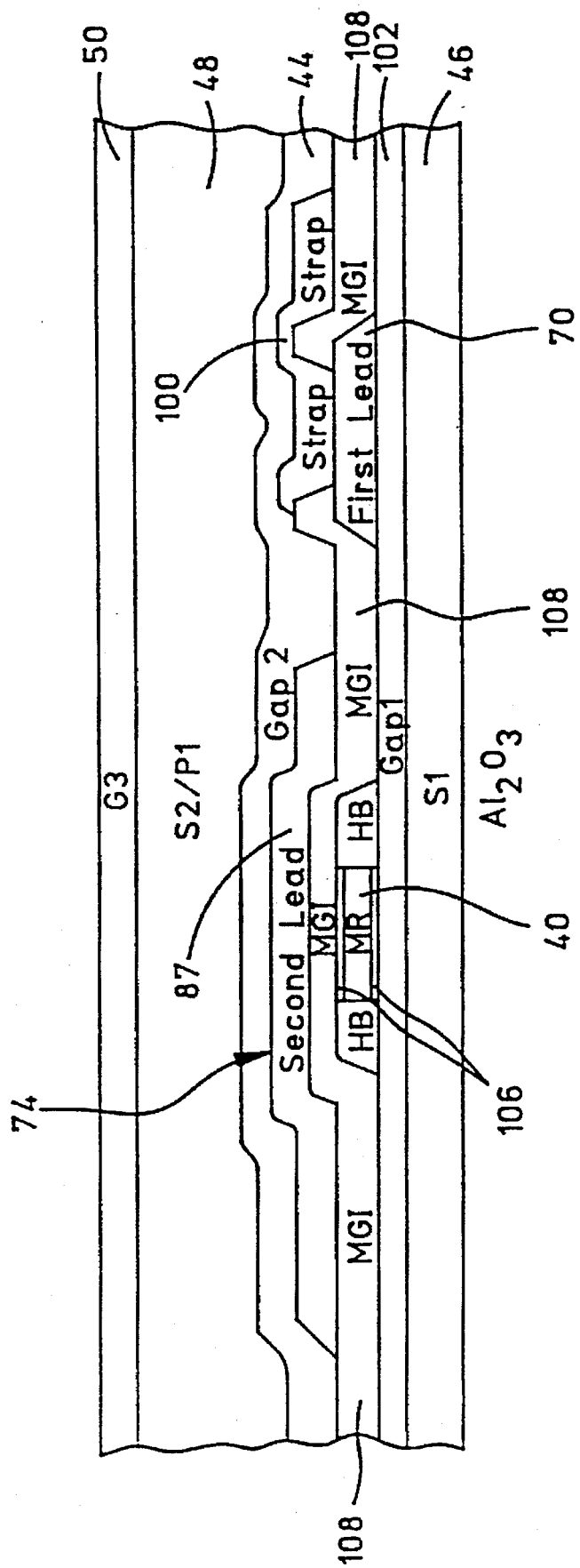
FIG. 7 is similar to FIG. 5 except it is taken along plane VII—VII of FIG. 4.

In reference to FIGS. 1 and 2, the method of making the thin film orthogonal MR head may include the steps of forming the MR stripe 40, forming a first lead layer 70 having first and second ends, forming a second lead layer 74 having first and second ends, connecting the first end to the first lead layer 70 to a bottom portion 72 of the MR stripe, connecting a first end of the second lead layer 74 to a top portion 76 of the MR stripe, and extending the second lead layer 74 across the MR stripe between its top and bottom portions 72 and 76 so as to position the second lead layer 74 in a magnetically coupled relationship with the MR stripe. The method may further include connecting the second end of the first lead layer 70 to a first terminal 78 and connecting the second end of the second lead layer 74 to the second terminal 80. The method may further include forming the second lead layer 74 in a single deposition step so that the second lead layer 74 is a single thin film lead layer. The method may further include forming a first shield layer 46, forming a first gap layer 42 on top of the first shield layer, forming a mid-gap insulation layer 108 (see FIGS. 6–8) on top of the MR stripe and the first gap layer 42, and forming the second lead layer 74 on top of the mid-gap insulation layer 108. The method may also include forming ground strap layers 92 and 98 in the same step as forming the second lead layer 74 and connecting the ground strap layer 98 to the second terminal 80. The method may still further include forming a second gap layer 44 on top of the second lead layer 74 and the mid-gap insulation layer 108, forming a second shield layer 48 on top of the second gap layer 44 and connecting the first lead layer 70 and the first and second shield layers 46 and 48 to ground.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method of making a thin film orthogonal MR read head which has an air bearing surface (ABS) comprising the unordered steps of:

forming an MR stripe with first and second end portions and a middle portion therebetween, the first end portion being adjacent the ABS and the second end portion being recessed in the head from the ABS;

forming a first lead layer having first and second ends;

forming a second lead layer having first and second ends;

connecting the first end of the first lead layer to said first end portion of the MR stripe;

connecting the first end of the second lead layer to said second end portion of the MR stripe;

forming only first and second terminals for the MR stripe;

connecting the second end of the first lead layer to the first terminal and connecting the second end of the second lead layer to the second terminal so that the MR stripe and the first and second lead layers are connected in series across the first and second terminals; and extending the second lead layer substantially parallel to the ABS away from the MR stripe, thence extending the second lead layer in a turn of at least substantially 180° and thence extending the second lead layer parallel to the ABS across the middle portion of the MR stripe so as to magnetically couple the second lead layer to the MR stripe when a current is conducted through the second lead layer.

2. A method as claimed in claim 1 including the steps of:

forming the second lead layer in a single step of deposition so that the second lead layer is a single thin film layer.

3. A method as claimed in claim 2 including the steps of:

forming a ground strap layer in the same step of forming said second lead layer; and connecting the ground strap layer to the first terminal.

4. A method as claimed in claim 1 including the steps of:

forming a first shield layer;

forming a first gap layer on the first shield layer;

forming a mid-gap insulation layer on the MR stripe and the first gap layer; and forming the second lead layer on the mid-gap insulation layer.

5. A method as claimed in claim 4 including the steps of:

forming a second gap layer on the second lead layer and the mid-gap insulation layer;

forming a second shield layer on the second gap layer; and connecting the first lead layer and the first and second shield layers to ground.

6. A method as claimed in claim 5 including the steps of:

forming the second lead layer in a single step of deposition so that the second lead layer is a single thin film layer.

7. A method as claimed in claim 6 including the steps of:

forming a ground strap layer in the same step of forming said second lead layer; and connecting the ground strap layer to the second terminal.

8. A method of making a thin film orthogonal magnetoresistive MR head which has an air bearing surface (ABS) comprising the steps of:

forming a single orthogonal MR sensor having first and second ends, the first end being at said ABS and the second end being recessed from the ABS;

forming a first lead layer with first and second ends and forming a second lead layer with first and second ends;

connecting the first end of the first lead layer to a first end portion of the MR sensor and connecting the first end of the second lead layer to a second end portion of the MR sensor so that the MR sensor has a middle portion between said first and second end portions;

forming only first and second terminals for said MR sensor;

connecting the second end of the first lead layer to the first terminal and connecting the second end of the second lead layer to the second terminal so that the first and second lead layers and the MR sensor are connected in series across the first and second terminals; and the step of forming the second lead layer including extending a length portion of the second lead layer transversely across said middle portion of the MR sensor in a direction substantially parallel to said ABS with said length portion in series with all remaining length portions of the second lead layer, the first lead layer and the MR sensor so as to induce a magnetic bias field into the MR sensor when a sense current is conducted through the MR sensor via said first and second terminals.

9. A method as claimed in claim 8 including the step of:

forming a mid-gap insulation layer separating the second lead layer from the MR sensor with a via which connects the first end of the second lead layer to the second end of the MR sensor.

10. A method as claimed in claim 9 including the steps of:

forming a first shield layer;

forming a first gap layer on top of the first shield layer;

the step of forming the MR sensor forming the MR sensor on the first gap layer;

the step of forming the mid-gap insulation layer including forming the mid-gap insulation layer on the MR sensor and the first gap layer; and separating said transverse portion of the second lead layer from the first shield layer by the first gap layer and the mid-gap insulation layer.

11. A method of making a thin film orthogonal magnetoresistive (MR) head which has an air bearing surface (ABS) comprising the steps of:

forming a single orthogonal MR sensor having first and second ends, the first end being at said ABS and the second end being recessed from the ABS;

forming a first lead layer with first and second ends and forming a second lead layer with first and second ends;

connecting the first end of the first lead layer to a first end portion of the MR sensor and connecting the first end of the second lead layer to a second end portion of the MR sensor so that the MR sensor has a middle portion between said first and second end portions;

forming only first and second terminals for said MR sensor;

connecting the second end of the first lead layer to the first terminal and connecting the second end of the second lead layer to the second terminal so that the first and second lead layers and the MR sensor are connected in series across the first and second terminals;

the step of forming the second lead layer including extending a length portion of the second lead layer transversely across said middle portion of the MR sensor in a direction substantially parallel to said ABS with said length portion in series with all remaining length portions of the second lead layer, the first lead layer and the MR sensor so as to induce a magnetic bias field into the MR sensor when a sense current is conducted through the MR sensor via said first and second terminals;

forming a mid-gap insulation layer separating the second lead layer from the MR sensor with a via which connects the first end of the second lead layer to the second end of the MR sensor;

forming a first shield layer;

forming a first gap layer on top of the first shield layer;

the step of forming the MR sensor forming the MR sensor on the first gap layer;

the step of forming the mid-gap insulation layer including forming the mid-gap insulation layer on the MR sensor and the first gap layer;

separating said transverse portion of the second lead layer from the first shield layer by the first gap layer and the mid-gap insulation layer;

forming a second shield layer;

forming a second gap layer between the first lead layer and the second shield layer;

connecting the first lead layer to the first shield layer through a via in the first gap layer and to the second shield layer through a via in each of the mid-gap insulation layer and the second gap layer; and connecting the first terminal to ground.

12. A method of making the thin film orthogonal MR head as claimed in claim 11 in combination with a magnetic media drive comprising the steps of:

providing a housing;

supporting the head in the housing;

mounting medium moving means in the housing for moving a magnetic medium past the head in a transducing relationship therewith;

connecting positioning means to the support for moving the head to multiple positions with respect to a moving magnetic medium so as to process signals with respect to multiple tracks on the magnetic medium; and connecting control means to the head, the magnetic medium moving means and the positioning means for controlling and processing signals with respect to the head, controlling movement of the magnetic medium and controlling the position of the head.

13. A method of making a combined head which includes an orthogonal MR read head and an inductive write head which includes a second pole layer, the combined head having an air bearing surface (ABS), said method comprising the steps of:

forming a single orthogonal MR stripe which extends perpendicular to the ABS, the MR stripe being bounded by first and second end edges and a pair of spaced apart side edges, the first end edge forming a portion of said ABS;

forming the MR stripe with an easy axis which extends substantially parallel to the ABS;

connecting a first end of a first lead layer to a first end portion of the MR stripe adjacent said ABS and connecting a first end of a second lead layer to a second end portion of the MR stripe spaced apart from the first end portion so that the MR stripe has a middle portion between the first and second end portions and which is electrically insulated from the first and second lead layers;

forming only first and second terminals for the MR stripe;

connecting a second end of the first lead layer to the first terminal and connecting a second end of the second lead layer to the second terminal so that the MR stripe and the first and second lead layers are connected in series across the first and second terminals;

forming the second lead layer with a first portion which extends parallel to the ABS away from the second end of the MR stripe, with a second portion which extends from the first portion in a turn of at least substantially 180° and with a third portion which extends from the second portion parallel to the ABS and across the middle portion of the MR stripe so as to be magnetically coupled to the MR stripe when a sense current is conducted across said first and second terminals.

14. A method as claimed in claim 13 including the step of:

connecting a longitudinal biasing layer to each side edge of the MR stripe with each longitudinal biasing layer having first and second substantially planar surfaces.

15. A method as claimed in claim 14 including the step of:

forming an MR element which includes the MR stripe with substantially planar surfaces which are substantially coextensive with the first and second planar surfaces respectively of each of the longitudinally biasing layers.

16. A method as claimed in claim 15 including the steps of:

forming the first lead layer with a portion which extends laterally across and in contact with said second planar surfaces of the longitudinally biasing layers and the MR stripe; and forming said portion of the first lead layer so that it forms a part of the ABS of the MR head.

17. A method as claimed in claim 16 including the steps of:

forming the second pole layer with a width at the head surface; and forming said planar surface portions of the MR stripe and the longitudinal biasing layers with a width which is greater than the width of the second pole tip.

18. A method as claimed in claim 17 including the steps of:

forming a first shield layer;

forming a first gap layer formed on the first shield layer;

forming the MR stripe on the first gap layer;

forming a mid-gap insulation layer on the MR stripe and the first gap layer;

forming the first portion of the second lead so that it is electrically connected to the MR stripe through a via in said mid-gap insulation layer; and separating the second and third portions of the second lead layer from the first shield layer with the first gap layer and the mid-gap insulation layer.

19. A method as claimed in claim 18 including the steps of:

forming a second shield layer;

forming a second gap layer between the first lead layer and the second shield layer;

forming the MR stripe between the first and second shield layers;

connecting the first lead layer to the first shield layer through a via in the first gap layer and to the second shield layer through a via in each of the mid-gap insulation layer and the second gap layer; and connecting the first terminal to ground.

20. A method as claimed in claim 19 including the steps of:

forming the second lead layer with a fourth portion which extends from the third portion and which is connected to said second terminal; and separating the fourth portion from the first shield layer by the first gap layer and the mid-gap insulation layer.

21. A method as claimed in claim 20 including the step of:
forming the first, second, third and fourth portions of the second lead layer as a single thin film layer.

22. A method as claimed in claim 21 including the step of:
connecting a ground strap layer to the first lead layer and the first terminal so that the ground strap layer is substantially planar with the second layer.

23. A method of making the combined head as claimed in claim 22 in a magnetic media drive, the method comprising the steps of:
providing a housing;
supporting the combined head in the housing;
mounting medium moving means in the housing for moving a magnetic medium past the head in a transducing relationship therewith;
connecting positioning means to the support for moving the head to multiple positions with respect to a moving magnetic medium so as to process signals with respect to multiple tracks on the magnetic medium; and
connecting control means to the head, the magnetic medium moving means and the positioning means for controlling and processing signals with respect to the head, controlling movement of the magnetic medium and controlling the position of the head.

24. A method of making a combined head which includes an orthogonal MR read head and an inductive write head which includes a second pole layer, the combined head having a head surface, said method comprising the steps of:
forming a single orthogonal MR stripe which extends perpendicular to the head surface, the MR stripe being bounded by first and second end edges and a pair of spaced apart side edges, the first end edge forming a portion of said head surface;
forming the MR stripe with an easy axis which extends substantially parallel to the head surface;
connecting a first lead layer to a first end portion of the MR stripe adjacent said head surface and connecting a second lead layer to a second end portion of the MR stripe spaced apart from the first end portion so that the first and second lead layers and the MR stripe are connected in series, the second lead layer extending across a middle portion of the MR stripe which is located between the first and second end portions and the second lead layer is electrically insulated from the middle portion;
forming only first and second terminals;
connecting the first lead layer to the first terminal and connecting the second lead layer to the second terminal; and
connecting a longitudinal biasing layer to each side edge of the MR stripe with each longitudinal biasing layer having first and second substantially planar surfaces.

25. A method as claimed in claim 24 including the step of:
forming an MR element which includes the MR stripe with substantially planar surfaces which are substantially coextensive with the first and second planar surfaces respectively of each of the longitudinally biasing layers.

26. A method as claimed in claim 25 including the steps of:
forming the first lead layer with a portion which extends laterally across and in contact with said second planar surfaces of the longitudinally biasing layers and the MR stripe; and
forming said portion of the first lead layer so that it forms a part of the ABS of the MR head.

27. A method as claimed in claim 26 including the steps of:
forming the second pole layer with a width at the head surface; and
forming said planar surface portions of the MR stripe and the longitudinal biasing layers with a width which is greater than the width of the second pole tip.

28. A method as claimed in claim 27 including the step of:
forming the second lead layer with a first portion which extends laterally in a first direction from the connection of the second lead layer to the MR stripe, with a second portion which extends in a second direction toward the head surface from the first portion and with a third portion which extends laterally in a third direction substantially opposite to said first direction so that the third portion extends across the middle portion of the MR stripe.

29. A method as claimed in claim 28 including the steps of:
forming a first shield layer;
forming a first gap layer formed on the first shield layer;
forming the MR stripe on the first gap layer;
forming a mid-gap insulation layer on the MR stripe and the first gap layer;
forming the first portion of the second lead so that it is electrically connected to the MR stripe through a via in said mid-gap insulation layer; and
separating the second and third portions of the second lead layer from the first shield layer with the first gap layer and the mid-gap insulation layer.

30. A method as claimed in claim 29 including the steps of:
forming a second shield layer;
forming a second gap layer between the first lead layer and the second shield layer;
forming the MR stripe between the first and second shield layers;
connecting the first lead layer to the first shield layer through a via in the first gap layer and to the second shield layer through a via in each of the mid-gap insulation layer and the second gap layer; and
connecting the first terminal to ground.

31. A method as claimed in claim 30 including the steps of:
forming the second lead layer with a fourth portion which extends from the third portion and which is connected to said second terminal; and
separating the fourth portion from the first shield layer by the first gap layer and the mid-gap insulation layer.

32. A method as claimed in claim 31 including the step of:
forming the first, second, third and fourth portions of the second lead layer as a single thin film layer.

33. A method as claimed in claim 32 including the step of:
connecting a ground strap layer to the first lead layer and the first terminal so that the ground strap layer is substantially planar with the second lead layer.

34. A method of making the combined head as claimed in claim 33 in a magnetic media drive, the method comprising the steps of:
providing a housing;
supporting the combined head in the housing;

mounting medium moving means in the housing for moving a magnetic medium past the head in a transducing relationship therewith;

connecting positioning means to the support for moving the head to multiple positions with respect to a moving magnetic medium so as to process signals with respect to multiple tracks on the magnetic medium; and connecting control means to the head, the magnetic medium moving means and the positioning means for controlling and processing signals with respect to the head, controlling movement of the magnetic medium and controlling the position of the head.

* * * * *